United States Patent [19]

Leppard et al.

[11] Patent Number: 4,459,270

[45] Date of Patent: Jul. 10, 1984

[54] PROCESS FOR THE REMOVAL OF HYDROGEN FROM GASES

[75] Inventors: Colin J. Leppard, Hampshire; Andrew Holt, Middlesex, both of England

[73] Assignees: CJB Developments Limited; Universal Matthey Products Limited, both of England

[21] Appl. No.: 474,292

[22] Filed: Mar. 11, 1983

[30] Foreign Application Priority Data

Mar. 12, 1982 [GB] United Kingdom ............... 8207233

[51] Int. Cl.³ .............................................. B01D 53/36
[52] U.S. Cl. .................................. 423/248; 423/219; 502/333; 502/334
[58] Field of Search ............... 423/219, 248; 502/333, 502/334

[56] References Cited

U.S. PATENT DOCUMENTS 2,582,885  1/1952  Rosenblatt .......................... 423/219
2,826,480  3/1958  Webster ............................... 423/219

Primary Examiner—Earl C. Thomas
Attorney, Agent, or Firm—Bacon & Thomas

[57] ABSTRACT

A process for the removal of hydrogen from a gas which also contains oxygen, which process comprises contacting the said gas at ambient temperature with a catalyst comprising a carrier of tin oxide and alumina impregnated with from 0.25 to 2.5% by weight of platinum and from 0.25 to 2.5% by weight of palladium.

9 Claims, 1 Drawing Figure

PROCESS FOR THE REMOVAL OF HYDROGEN FROM GASES

The present invention relates to a process for the removal of hydrogen from gases and, in particular, to a process for the removal of hydrogen from wet air streams at ambient temperatures.

BACKGROUND OF THE INVENTION

Previous catalytic methods for the removal of hydrogen from air streams have involved the use of catalysts where the air stream and catalyst bed have to be heated to a relatively high temperature, for example to 100° to 150° C. This involves the expenditure of considerable energy if large flowrates of air are involved, as well as the added cost and complication of the necessary heaters and means for cooling the discharged air, as is usually required to return the treated air stream at ambient temperature.

Hydrogen can originate in an air stream from a number of sources, such as the operation of hydrogen production equipment and battery charging. In an enclosed air space, it is essential to maintain the hydrogen concentration below the lower explosive limit (L.E.L.), for example at 50 to 60% of the L.E.L., in order to negate risks of hydrogen explosions or fires.

It is an object of the invention to provide a process for the removal of hydrogen from air streams which can be operated at ambient temperature, thus obviating the operating and capital cost associated with heating and cooling the treated air streams.

SUMMARY OF THE INVENTION

Accordingly, the present invention provides a process for the removal of hydrogen from a gas which also contains oxygen, which process comprises contacting the said gas at ambient temperature with a catalyst comprising a carrier of tin oxide and alumina impregnated with from 0.25 to 2.5% by weight of platinum and from 0.25 to 2.5% by weight of palladium.

BRIEF DESCRIPTION OF THE DRAWINGS

The single FIGURE of the accompanying drawings illustrates one embodiment of the means for containing the catalyst and contacting it with the hydrogen-containing air stream.

DETAILED DESCRIPTION OF THE INVENTION

Figure 1:
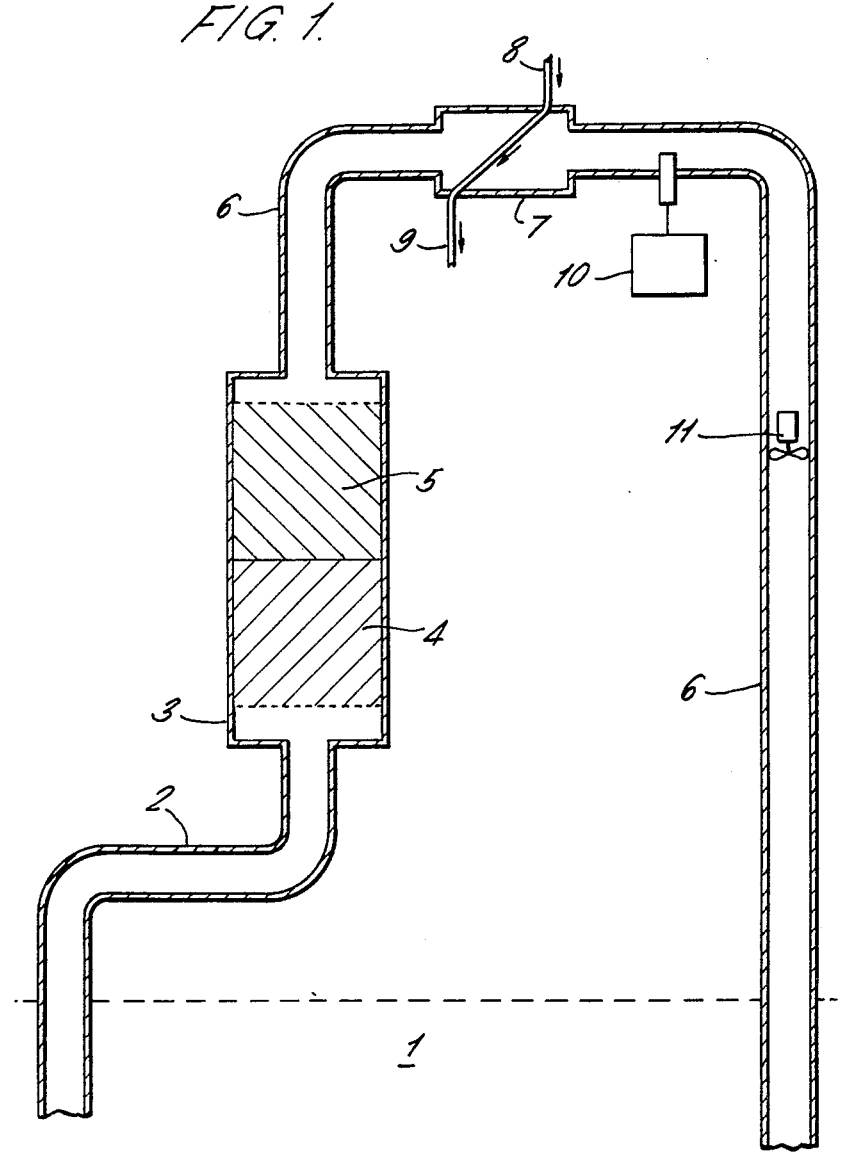

The process of the present invention is particularly suitable for the removal of hydrogen from wet air, for example air having a relative humidity in the range of from 20 to 100%.

The gas treated in the process of the invention is at ambient temperature, for example a temperature in the range of from 10° to 30° C., preferably about 20° C.

The catalyst carrier preferably comprises tin oxide blended with from 10 to 50% by weight of alumina trihydrate, more preferably 20% by weight of alumina trihydrate. The catalyst carrier is preferably impregnated with 0.5% by weight of platinum and 2% by weight of palladium.

The catalyst carrier may also be impregnated with from 0.25 to 2.5% by weight of one or more other metals from group VIII of the Periodic Table. The total amount of group VIII metals should preferably not exceed about 6% by weight.

In the present invention the catalyst is sufficiently active that the oxidation of hydrogen in the presence of oxygen can proceed to ambient temperatures, thus obviating the operating and capital cost associated with heating and cooling the treated air stream.

In a preferred use of the process of the invention, a hydrogen containing air stream is taken from an enclosed space, passed through an apparatus containing the catalyst where the hydrogen is oxidised to water and the hydrogen-free air is then returned to the enclosed space.

The process of the invention can also be used to remove hydrogen from other gases such as nitrogen, and in this case a small excess of oxygen is required to be added. Furthermore, the process of the invention can also be used for the removal of small amounts of oxygen from an inert gas after the addition of hydrogen.

An outline of a preferred procedure for the preparation of the catalyst used in the invention is given below.

Commercial tin oxide (known as meta stannic acid), is dry blended together with 10–50% alumina trihydrate powder, 20% being the preferred level, until homogenous. The resultant powder is then pressed into pellets of the required shape.

The pellets are then dried at a temperature in the range of from 120° to 250° C. for 1–4 hours and finally calcined at a temperature in the range of from 450° to 550° for 3 hours, with 500° C. being preferred.

The calcined base pellets are then impregnated with 0.25 to 2.5% by weight platinum (Pt) and 0.25 to 2.5% by weight palladium (Pd) using aqueous solutions of tetrammine platinous hydroxide and tetrammine palladous nitrate [Pt (NH$_3$)$_4$] (OH)$_2$ and [Pd (NH$_3$)$_4$] (NO$_3$)$_2$, which are the preferred salts. Other Pt and Pd soluble salts may be used. The metal solutions may be impregnated onto the base using an ion exchange method or rotary evaporation techniques.

When all the metal salts have been absorbed onto the base, and the catalyst pellets are superficially dry, the pellets are dried at a temperature in the range of from 100° to 180° C. in air for 2 to 5 hours and then calcined in air at 350° to 500° C. for 2 to 5 hours.

The calcined pellets produced as described above are reduced in a gas stream of 5% hydrogen, 95% nitrogen v/v for 2 to 5 hours at a temperature of 200° to 450° C. Gas volume to catalyst volume ratios of 100:1 are used. At the end of this time the hydrogen flow is stopped and the catalyst allowed to cool to a temperature of 40° to 100° C. in nitrogen. When cool, a gas mix of 1 to 10% in nitrogen is contacted with the catalyst and flowed over the catalyst until the exotherm seen on initial contact has dropped back to zero. When cool, the catalyst is ready for use.

As an alternative to the pellets produced as described above, the catalyst can be prepared as extrudates of any size, although the preferred size is 2 mm diameter by 1 cm long extrudates, by the following method. The blended homogeneous powder from (a) is kneaded with dilute nitric acid until a dough is formed. This dough is then extruded to give extrudates of the preferred size. The resultant wet extrudates are dried, calcined, and impregnated with platinum and palladium and reduced in the same way as described above for the production of pellets.

DETAILED DESCRIPTION OF THE DRAWINGS

The present invention will further be described with reference to the single FIGURE of the accompanying drawings, which shows one embodiment of the means for containing the catalyst and contacting it with the hydrogen-containing air stream. The air stream containing the hydrogen is drawn by means of air blower or fan 11 from the enclosed space 1, from which it is desired to remove the hydrogen, and passes along inlet duct 2 into vessel 3. This vessel contains a pre-filter bed of activated carbon 4, or similar material, for the removal of any organic vapours which could be present in the contaminated air and which could cause a deterioration in the oxidative activity of the catalyst if such vapours were not removed. It will be appreciated that it is unnecessary to include this pre-filter if the air stream to be treated is free of contaminants which could affect the performance of the catalyst.

The air stream passes upwards through vessel 3 into the catalyst section of the bed, 5. The length to diameter ratio of the catalyst section is preferably minimised in order to minimise the pressure drop across the bed, but must be of sufficient magnitude to promote the effective contact of the air/hydrogen stream with the catalyst. In practice, a length to diameter ratio of about 1:1 is found to be suitable. The space velocity of the air stream (defined as: the number of volumes of air/hydrogen passed through the catalyst bed per hour, divided by the volume of the catalyst bed), which has been found to be effective lies in the range of from 10,000 to 30,000$h^{-1}$, with a preferred value of about 20,000$h^{-1}$. Space velocities at the lower end of this range would be used for the complete removal of hydrogen from the air stream, whilst values towards the upper end of the range are chosen when only partial removal of the hydrogen is required.

The air stream, now substantially free of hydrogen passes out of vessel 3 along outlet duct 6, via the optional air chiller 7, cooled by counter-flow water inlet 8 and outlet 9. The air chiller is required in certain circumstances, for example, where high hydrogen concentrations, for example 1 to 2% by volume exist in the inlet air and where the resulting increase in temperature due to the exothermic reaction when the hydrogen is oxidised on the catalytic bed would be harmful when the air stream is returned to the enclosed space. The treated air stream is then passed over the sensing element of the hydrogen analyser 10, so that the efficacy of apparatus for removing the hydrogen can be monitored. It is desirable that alarm contacts are provided with this hydrogen analyser so that the contacts can turn off fan 11 and provide an audible alarm in the event that the hydrogen concentration in the treated air rises above a present limit. Similarly, a second hydrogen analyser can be used to measure the hydrogen concentration in the inlet air with alarm contacts performing the same functions as those incorporated in the first analyser, if the hydrogen concentration in the inlet air approaches the lower explosive limit. The air stream then passes via blower or fan 11. This fan is chosen with respect to the desired air flowrate through the bed and the bed/ducting pressure loss. Finally, the air stream passes along the outlet duct and is returned to the enclosed space, ensuring that the point of return is sited as remote as possible from inlet duct 2.

The present invention will be further described with reference to the following Examples.

EXAMPLE 1

Air containing hydrogen at a concentration of 2% v/v at a flowrate of 25 l/min was passed over a catalyst bed having a volume of 150 cm$^3$ (space velocity=10,000$h^{-1}$). The catalyst contained in the bed had the following formulation:
Alumina, as $Al_2O_3$—13.0% w/w
Tin Oxide, as $SnO_2$—84.5% w/w
Palladium, as Pd—2.0% w/w
Platinum, as Pt—0.5% w/w The air was maintained at a temperature of 20° C., at atmospheric pressure and its relative humidity was controlled at 50%. The experiment was continued for a duration of 6½ hours, during which time the hydrogen concentration in the air stream leaving the bed was monitored continuously and no hydrogen could be detected (detection limit 0.01% v/v). The temperature of the outlet air was about 150° C. during this period.

EXAMPLE 2

Air containing hydrogen at a concentration of 0.2% v/v at a flowrate of 50 l/min was passed over a catalyst bed containing the same catalyst as in Example 1 having a volume of 150 cm$^3$ (space velocity=20,000$h^{-1}$). The air was maintained at a temperature of 20° C. at atmospheric pressure and its relative humidity was controlled at 50%. This experiment was continued for a duration of 102 hours, during which time the hydrogen concentration in the air stream was monitored continuously and was found to be in the range 0.04 to 0.09% v/v. The temperature of the air leaving the bed was 25° C. during this period.

We claim:

1. A process for the removal of hydrogen from a gas which also contains oxygen, which process consists essentially of contacting the said gas at ambient temperature with a catalyst comprising a carrier of tim oxide and alumina impregnated with from 0.25 to 2.5% by weight of platinum and from 0.25 to 2.5% by weight of palladium.

2. Process according to claim 1 wherein the gas to be treated is wet air.

3. Process according to claim 2 wherein the wet air has a relative humidity in the range of from 20 to 100%.

4. Process according to claim 1 wherein the gas is at a temperature in the range of from 10° to 30° C.

5. Process according to claim 4 wherein the gas is at a temperature of 20° C.

6. Process according to claim 1 wherein the catalyst carrier comprises tin oxide blended with from 10 to 50% by weight of alumina trihydrate.

7. Process according to claim 6 wherein the catalyst carrier comprises tin oxide blended with 20% by weight of alumina trihydrate.

8. Process according to claim 1 wherein the catalyst carrier is impregnated with 0.5% by weight of platinum and 2% by weight of palladium.

9. Process according to claim 1 wherein the catalyst carrier is additionally impregnated with from 0.25 to 2.5% by weight of one or more other group VIII metals.

* * * * *